US010532382B2

(12) United States Patent
Miron et al.

(10) Patent No.: US 10,532,382 B2
(45) Date of Patent: Jan. 14, 2020

(54) METHOD AND SYSTEM FOR CLEANING ELECTRIC GRID

(71) Applicant: ELECTRICAL GRID MONITORING LTD., Rosh Haayin (IL)

(72) Inventors: Eyal Miron, Hod-Hasharon (IL); Nimrod Sandlerman, Ramat-Gan (IL)

(73) Assignee: ELECTRICAL GRID MONITORING LTD., Yavne (IL)

( * ) Notice: Subject to any disclaimer, the term of this patent is extended or adjusted under 35 U.S.C. 154(b) by 156 days.

(21) Appl. No.: 15/738,631

(22) PCT Filed: Jun. 21, 2016

(86) PCT No.: PCT/IB2016/053671
§ 371 (c)(1),
(2) Date: Dec. 21, 2017

(87) PCT Pub. No.: WO2016/207784
PCT Pub. Date: Dec. 29, 2016

(65) Prior Publication Data
US 2018/0207684 A1    Jul. 26, 2018

Related U.S. Application Data

(60) Provisional application No. 62/183,438, filed on Jun. 23, 2015.

(51) Int. Cl.
*B08B 1/00* (2006.01)
*H02G 1/02* (2006.01)
*B08B 5/02* (2006.01)

(52) U.S. Cl.
CPC ............... *B08B 1/008* (2013.01); *B08B 1/00* (2013.01); *B08B 1/002* (2013.01); *B08B 5/02* (2013.01); *H02G 1/02* (2013.01)

(58) Field of Classification Search
CPC .......... B08B 1/008; B08B 1/00; B08B 1/002; B08B 5/02; B08B 15/002; H02G 1/02; H02G 7/16; A47L 5/38; D01H 11/005; B23Q 11/0046; B65H 2701/31
See application file for complete search history.

(56) References Cited

U.S. PATENT DOCUMENTS

2014/0176122 A1* 6/2014 Davis ................ A46B 9/028
                                                324/126

FOREIGN PATENT DOCUMENTS

| CN | 202586170 | * 12/2012 |
| CN | 104600628 | * 5/2015 |
| DE | 102006/005929 | * 8/2007 |

* cited by examiner

*Primary Examiner* — Robert J Scruggs
(74) *Attorney, Agent, or Firm* — Alphapatent Associates, Ltd; Daniel J. Swirsky

(57) ABSTRACT

A method and a device for cleaning an electric cable and/or an electric insulator connected to the electric cable. The device includes a power supply module operative to extract electric power from magnetic field surrounding an electric cable, a propulsion module for maneuvering the device at least one of along the electric cable and around the cable, and a dusting module for cleaning the electric cable, where the device is mounted on a single electric cable of an electric transmission grid and/or an electric distribution grid.

11 Claims, 5 Drawing Sheets

METHOD AND SYSTEM FOR CLEANING ELECTRIC GRID

CROSS-REFERENCE TO RELATED APPLICATIONS

This application is a U.S. National Phase Application under 35 U.S.C. 371 of International Application No. PCT/IB2016/053671, which has an international filing date of Jun. 21, 2016, and which claims the benefit of U.S. Provisional Application No. 62/183,438, filed Jun. 23, 2015, the disclosure of which is incorporated herein by reference in its entirety.

FIELD

The method and apparatus disclosed herein are related to the field of electric grid, and, more particularly but not exclusively, to electric transmission and distribution networks.

BACKGROUND

The electric grid is known to collect dust, which, when wet by rain or humidity, may affect the conductivity or resistance of electric cables and insulator. There is therefore a need to regularly clean electric cable and insulators. Cleaning, or dusting, cable and insulators is usually performed from a distance using a strong stream of water. Cleaning live grid from ground-operated machinery requires the use of distilled water, while regular water may be used by airborne machinery using, for example, a helicopter. Both methods are laborious and expensive. It would therefore be highly advantageous to have solutions devoid of the above limitations.

SUMMARY

According to one exemplary embodiment there is provided a method, a device, and a computer program including a power supply module operative to extract electric power from magnetic field surrounding an electric cable, a propulsion module for maneuvering the device at least one of along the electric cable and around the cable, and a dusting module for cleaning the electric cable, where the device is mounted on a single electric cable of an electric transmission grid and/or an electric distribution grid.

According to yet another exemplary embodiment there is provided a method, a device, and a computer program additionally including at least one of a current measuring unit, a voltage measuring unit, a temperature measuring unit, and a camera, and a controller module controllably coupled to the propulsion module, the dusting module, and one or more of a current measuring unit, a voltage measuring unit, a temperature measuring unit, and a camera, where the controller module is operative to operate at least one of the propulsion module and the dusting module responsive to measurements taken by the at least one of a current measuring unit, a voltage measuring unit, a temperature measuring unit, and a camera.

According to still another exemplary embodiment there is provided a method, a device, and a computer program where the dusting module includes a brush for brushing the cable, and/or an air blowing device for dusting the cable.

Further according to another exemplary embodiment there is provided a method, a device, and a computer program additionally including a communication module communicatively coupled to the controller module and operative to communicate a measurement including a current measurement taken by the current measuring unit, and/or a voltage measurement taken by the voltage measuring unit, and/or an image taken by the a camera, and to receive such measurement taken by another device, where the controller module may operate the propulsion module and/or the dusting module responsive to measurements taken by the current measuring unit, the voltage measuring unit, and/or the camera of another device.

Still further according to another exemplary embodiment there is provided a method, a device, and a computer program where the device additionally including a communication module configured to communicate with a remote controller, and a controller module controllably coupled to the propulsion module, the dusting module, and the communication module, where the controller module is operative to operate the propulsion module and/or the dusting module responsive to commands received from the remote controller.

Yet further according to another exemplary embodiment there is provided a method, a device, and a computer program including a power supply module operative to extract electric power from magnetic field surrounding an electric cable, a propulsion module for maneuvering the device along the electric cable, and an insulator cleaning module, where the device is mounted on a single electric cable of at least one of an electric transmission grid and an electric distribution grid.

Even further according to another exemplary embodiment there is provided a method, a device, and a computer program additionally including a current measuring unit, and/or a voltage measuring unit, and/or a camera, as well as a controller module controllably coupled to the propulsion module, the dusting module, and one or more of the current measuring unit, the voltage measuring unit, the temperature measuring unit, and the camera, where the controller module is operative to operate the propulsion module and/or the insulator cleaning module responsive to measurements taken by one or more of the current measuring unit, the voltage measuring unit, the temperature measuring unit, and the camera.

Additionally, according to another exemplary embodiment there is provided a method, a device, and a computer program where the insulator cleaning module includes a brush for brushing an insulator, and/or an air blowing module for dusting the insulator, and an articulated arm for moving the at least one of the brush and/or the air blowing module along the insulator.

According to yet another exemplary embodiment there is provided a method, a device, and a computer program additionally including a communication module operative to perform any of: communicating a measurement including any of a current measurement taken by the current measuring unit, a voltage measurement taken by the voltage measuring unit, and an image taken by the a camera, as well as receive such measurement taken by another device, where the controller module is operative to operate at least one of the propulsion module and the insulator cleaning module responsive to such measurements taken by a current measuring unit, and/or a voltage measuring unit, and/or a camera of another device.

According to still another exemplary embodiment there is provided a method, a device, and a computer program additionally including a communication module configured to communicate with a remote controller, and a controller module controllably coupled to the propulsion module, the insulator cleaning module, and the communication module, where the controller module is operative to operate the propulsion module and/or the dusting module responsive to commands received from the remote controller.

Unless otherwise defined, all technical and scientific terms used herein have the same meaning as commonly understood by one of ordinary skill in the relevant art. The materials, methods, and examples provided herein are illustrative only and not intended to be limiting. Except to the extent necessary or inherent in the processes themselves, no particular order to steps or stages of methods and processes described in this disclosure, including the figures, is intended or implied. In many cases the order of process steps may vary without changing the purpose or effect of the methods described.

BRIEF DESCRIPTION OF THE DRAWINGS

Various embodiments are described herein, by way of example only, with reference to the accompanying drawings. With specific reference now to the drawings in detail, it is stressed that the particulars shown are by way of example and for purposes of illustrative discussion of the preferred embodiments only, and are presented in order to provide what is believed to be the most useful and readily understood description of the principles and conceptual aspects of the embodiment. In this regard, no attempt is made to show structural details of the embodiments in more detail than is necessary for a fundamental understanding of the subject matter, the description taken with the drawings making apparent to those skilled in the art how the several forms and structures may be embodied in practice.

In the drawings.

DETAILED DESCRIPTION

Figure 1:
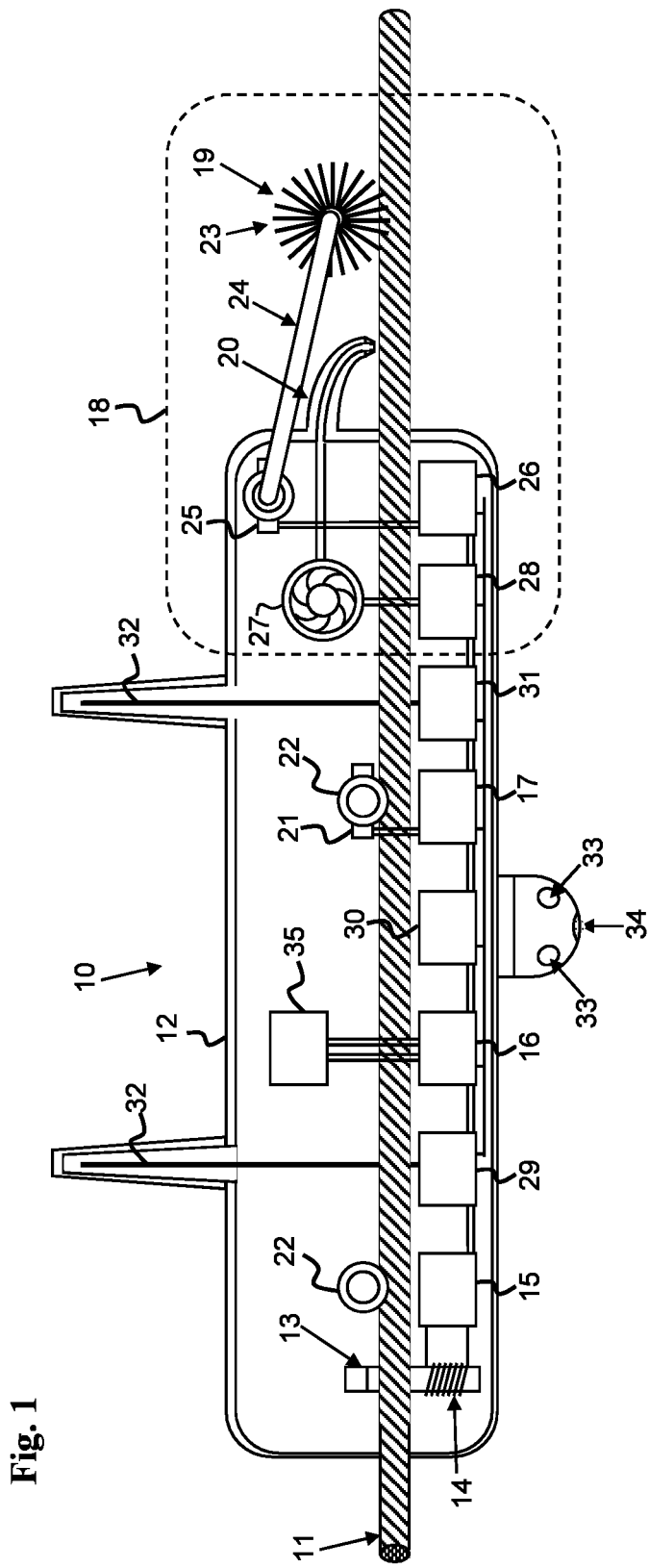
FIG. 1 is a simplified illustration of a dusting device mounted on an electric cable.

The present embodiments comprise a method and a system providing a dusting and/or cleansing electric grid, and particularly, but not limited to, electric cables and insulators. The principles and operation of a device and method for dusting electric grid according to the several exemplary embodiments may be better understood with reference to the following drawings and accompanying description.

Before explaining at least one embodiment in detail, it is to be understood that the embodiments are not limited in its application to the details of construction and the arrangement of the components set forth in the following description or illustrated in the drawings. Other embodiments may be practiced or carried out in various ways. Also, it is to be understood that the phraseology and terminology employed herein is for the purpose of description and should not be regarded as limiting.

In this document, an element of a drawing that is not described within the scope of the drawing and is labeled with a numeral that has been described in a previous drawing has the same use and description as in the previous drawings. Similarly, an element that is identified in the text by a numeral that does not appear in the drawing described by the text, has the same use and description as in the previous drawings where it was described.

The drawings in this document may not be to any scale. Different Figs. may use different scales and different scales can be used even within the same drawing, for example different scales for different views of the same object or different scales for the two adjacent objects.

The purpose of the embodiments is to provide a dusting device which is readily mountable on an electric cable of any voltage rating. The dusting device provides wireless backhaul, and can provide local services such as local wireless networking and/or remote sensing.

The term grid, or electric grid, refers to the electric transmission network and/or the electric distribution network. The term dusting refers to cleaning a cable or an insulator of the electric grid from dust and other undesirable and/or adverse material deposited over the cable or insulator.

Reference is now made to FIG. 1, which is a simplified illustration of a dusting device 10 mounted on an electric cable 11, according to one exemplary embodiment.

As shown in FIG. 1, the dusting device 10 may include a box, or a body, 12, through which the electric cable 11 passes. The box 12 is therefore constructed of two parts which may be opened, and then closed around the cable 11. The electric cable 11 may be a part of an electric transmission grid or an electric distribution network such as maintained by a power utility to provide electricity to the public, to industrial plants, etc. The dusting device 10 may therefore be mounted on a live cable 11. That is, when cable 11 is fully powered and/or carries electric voltage and/or electric current.

As shown in FIG. 1, the dusting device 10 may include a magnetic core 13 over which at least one coil is wrapped to form a winding 14. The magnetic core 13 may be mounted around the electric cable 11. The magnetic core 13 may be constructed from two parts, a part in each of the two parts of box 12, where the two parts of the magnetic core 13 are closed around electric cable 11 when box 12 is closed around electric cable 11. FIG. 1 shows dusting device 10 open, with one part of the box 12 removed, but with magnetic core 13 closed around electric cable 11.

The magnetic core 13 typically derives magnetic field from the electric current flowing in the electric cable 11. Winding 14 typically derives electric current from the magnetic flux in the magnetic core 13. Winding 14 may be electrically coupled to power supply module 15, which, as shown in FIG. 1, typically provides electric voltage to other modules of dusting device 10. It is appreciated that dusting device 10 may derive electric power from a single electric cable 11.

As shown in FIG. 1, the dusting device 10 may also include a controller module 16, a propulsion control module 17, and a dusting module 18. The dusting module 18 may include a brushing module 19 and/or an air blower module 20.

Controller module 16 may include a processor unit, one or more memory units (e.g., random access memory (RAM), a non-volatile memory such as a Flash memory, etc.), one or more storage units (e.g. including a hard disk drive and/or a removable storage drive, etc.) as may be used to store and/or to execute a software program and associated data and to communicate with external devices.

Propulsion control module 17 may be coupled to one or more actuating devices such as electric motor 21, which may be coupled to one or more wheels 22. Wheels 22 may be mounted on cable 11 to enable propulsion control module 17 to move the dusting device 10 along cable 11 by controlling the electric motor 21.

It is appreciated that the propulsion system of dusting device 10 (including, but not limited to propulsion control module 17, one or more electric motors 21, one or more wheels 22, etc.) may be operative to move dusting device 10 along cable 11 and/or to rotate dusting device 10 around cable 11.

It is appreciated that electric motor 21 represents herein any type of technology adequate to maneuver dusting device 10 along and/or around cable 11, including, but not limited to, an AC motor, a DC motor, a stepper motor, a pneumatic pump and/or motor, a hydraulic pump and/or motor, or any other type of actuator.

Brushing module 19 may include one or more brushes 23, typically pressed against to electric cable 11 by one or more arms 24 or a similar attachment device. Arms 24 are typically made from an electrically insulating material such as ceramics or plastic. Brushes 23 may be fixed, brushing electric cable 11 by the motion of dusting device 10 along cable 11. Alternatively, brushes 23 may be maneuverable by one or more brush actuating device 25 such as an electric motor, a stepper motor, a solenoid actuator, etc. Brush actuating devices 25 may be coupled to brush, or brushes, 23, and/or to arm, or arms, 24.

Brushing module 19 may include a brushing controller 26 communicatively coupled to the one or more brush actuating devices 25 and/or one or more arms 24. It is appreciated that brush 23 may be maneuvered in two or more axes so as to brush electric cable 11 from all sides. Alternatively, several brushes may be used.

Blower module 20 may include an air pump 27, such as a rotational pump, a piston air pump, or any other air blowing device. Blower module 20 may include blower controller 28 communicatively coupled to the air pump 27. It is appreciated that blower module 20 may produce pulsed air.

The dusting device 10 may also include a backhaul communication module 29, and a remote sensing module 30, and a local area communication module 31.

Backhaul communication module 29 and local area communication module 31 may be coupled, each and/or both, to one or more antennas 32. Remote sensing module 30 may be coupled to and control various sensors such as a temperature sensor (not shown), one or more cameras 33, one or more microphones 34, etc.

It is appreciated that a camera can be mounted on a system of axels providing three-dimensional rotation. Alternatively, a plurality, or an array, of fixed cameras can be mounted to cover a large field of view as needed.

Optionally, dusting device 10 may also include a global positioning service (GPS) module 35 and may use it to measure, monitor, and/or control the position of the dusting device 10 along electric cable 11.

Figure 2:
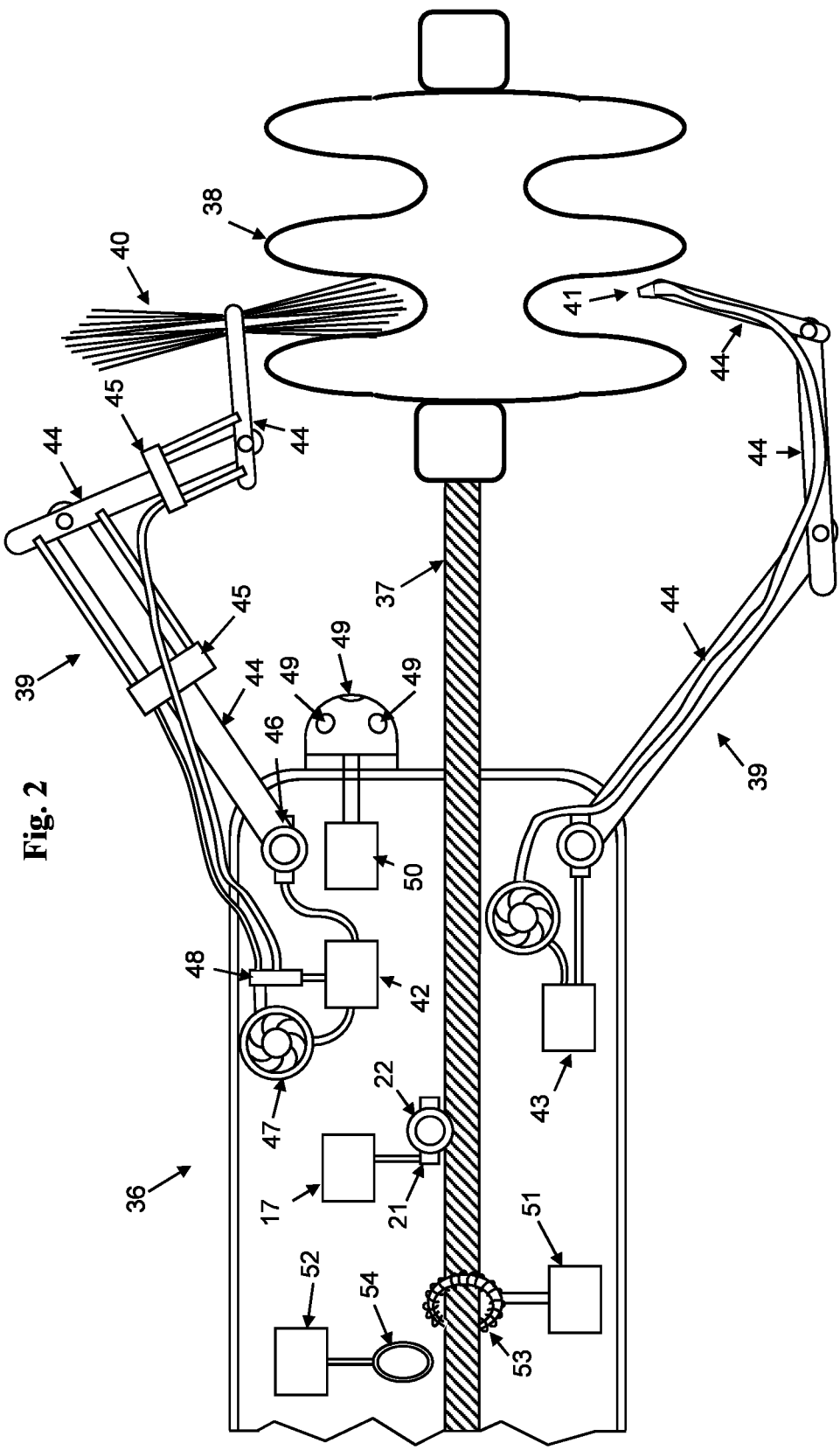
FIG. 2 is a simplified illustration of an insulator dusting device mounted on an electric cable connected to an insulator.

Reference is now made to FIG. 2, which is a simplified illustration of an insulator dusting device 36 mounted on an electric cable 37 connected to an insulator 38, according to one exemplary embodiment.

As an option, the illustration of FIG. 2 may be viewed in the context of the details of the previous Figures. Of course, however, the illustration of FIG. 2 may be viewed in the context of any desired environment. Further, the aforementioned definitions may equally apply to the description below.

It is appreciated that only part of insulator dusting device 36 is shown in FIG. 2, and that insulator dusting device 36 may include parts and modules of dusting device 10 as shown and described with reference to in FIG. 1 (but may not be shown in FIG. 2).

As shown in FIG. 2, insulator dusting device 36 may have one or more articulated arms 39. Articulated arms 39 may include one or more brushes 40 and/or one or more air plowing nozzles 41 or any other means or devices for cleaning and/or dusting an insulator such as insulator 38. Articulated arms 39, brushes 40 and/or air blowing nozzles 41 may be controlled by respective insulator dusting controllers 42 and 43.

It is appreciated that insulator dusting device 36 is mounted on electric cable 37, derives electric power from electric cable 37, and cleans insulator 38 that is connected to electric cable 37. Therefore, insulator dusting device 36 is on the same electric potential as electric cable 37 and has no electric contact with the electric neutral line or ground. It is appreciated that insulator dusting device 36 derives electric power from electric cable 37 using a magnetic core and power supply such as magnetic core 13 and power supply module 15 as shown and described with reference to FIG. 1.

It is appreciated that insulator dusting device 36 may be moved along electric cable 37, and/or rotated around electric cable 37, using a propulsion system such as propulsion control module 17, one or more electric motors 21, and one or more wheels 22 as shown and described with reference to FIG. 1.

As shown in FIG. 2, articulated arms 38 may include two or more articulated parts 44 that may be maneuvered by actuators 45. Actuators 45 may be operated by electrical power (e.g., electric motor 46), by hydraulic power, or by pneumatic power (e.g., pump 47).

Insulator dusting controllers 42 and 43 may be controllably coupled to their respective electric motors, pumps, valves 48, and/or actuators to control the movement and operation of the respective articulated arms and cleaning devices (e.g., brushes and air nozzles).

Insulator dusting controllers 42 and 43 may be controllably coupled, and/or communicatively coupled, to a master controller such as controller module 16 of dusting device 10 as shown and describer with reference to FIG. 1.

It is appreciated that the articulated arms are made of insulating materials such as, but not limited to, ceramics, plastic. Operating the articulated arms and their cleaning devices (e.g., brushes) using air pressure may also be advantageous with respect to electrical insulation.

As shown in FIG. 2, insulator dusting device 36 may additionally include remote sensing devices such as one or more cameras 49, which may be operated by a remote sensing controller 50. Remote sensing controller may also be controllably coupled, and/or communicatively coupled, to a master controller such as controller module 16 of dusting device 10 as shown and describer with reference to FIG. 1. The master controller may use the remote sensing devices to operate, and/or guide, and/or coordinate the operation of the articulated arms and their respective cleaning devices.

It is appreciated that there may be a plurality of types, shapes, and sizes of insulators and that each type, shape and size of insulator may require a different cleaning method. The master controller, using the remote sensing devices, may adapt the cleaning operation to the particular type, shape and size of the insulator 38.

The master controller may operate the articulated arms and their cleaning devices automatically or manually. When operating automatically, or autonomously, master controller may direct insulator dusting device 36 along electric cable 37 towards an insulator 38, identify the insulator (such as type, shape and size), select a cleaning plan and operate the articulated arms and their cleaning devices accordingly.

When operating manually, master controller may communicate with a user, either using backhaul communication, such as using backhaul communication module 29, or local area communication, such as using local area communication module, as shown and described with reference to FIG. 1. The user may control dusting device 36 remotely, for example, from the ground or from remote site. The user may control dusting device 36 by using a camera 49.

Dusting device 36 may additionally but optionally include a current sensor 51 and/or a voltage sensor 52. Current sensor 51 may include a coil 53, such as a Rogowski coil, mounted across or around electric cable 37. Voltage sensor 52 may include an electric field probe 54. The electric field probe may be, for example, in the form of a coil mounted along electric cable 37.

It is appreciated that the process of cleaning and/or dusting cable 37 and/or insulator 38 can be regulated and/or controlled according to a measurement of the current flowing via cable 37, or voltage measured for cable 37, resistance of any part of cable 37, an image of the cable (e.g., taken by a camera), light reflectance from the cable, as well as combinations thereof.

Particularly, but not exclusively, the process of cleaning and/or dusting cable 37 and/or insulator 38 may be controlled to lower or eliminate irregularities associated with current and/or voltage measured for cable 37 or their combinations, such as spikes and surges. It is appreciated that such current and/or voltage measurements may be executed in real time while cleaning and/or dusting cable 37 and/or insulator 38, or intermittently.

The analysis of the current and voltage measurements (or any other measurement as described above) as well as the control of the operation of dusting device 36 may be executed by a controller and/or processor within dusting device 36, such as controller module 16 shown and described with reference to FIG. 1. Alternatively, the analysis of the current and voltage measurements as well as the control of the operation of dusting device 36 may be executed by a remote controller and/or processor being in communication with dusting device 36. Alternatively, the analysis of the current and voltage measurements as well as the control of the operation of dusting device 36 may be executed by a user being in communication with dusting device 36. Such user may be located locally, for example having line-of-sight with dusting device 36, or remotely such as in a central control room.

Figure 3:
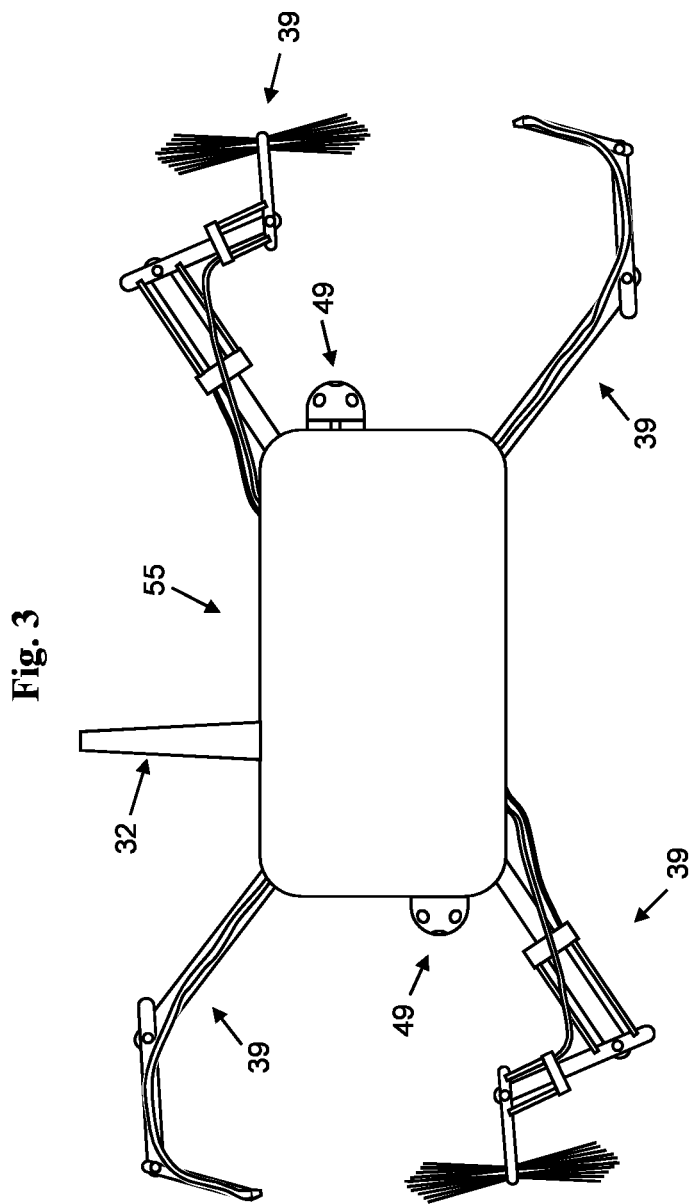
FIG. 3 is a simplified illustration of a dual-sided insulator dusting device.

Reference is now made to FIG. 3, which is a simplified illustration of a dual-sided insulator dusting device 55, according to one exemplary embodiment. As an option, the illustration of FIG. 3 may be viewed in the context of the details of the previous Figures. Of course, however, the illustration of FIG. 3 may be viewed in the context of any desired environment. Further, the aforementioned definitions may equally apply to the description below.

Dual-sided insulator dusting device 55 is similar to dusting device 36 of FIG. 2 except that it includes two sets of arms 39, brushes 40 and/or air blowing nozzles 41, as may be necessary to dust or clean insulators in both sides of a cable 37. It is appreciated that dual-sided insulator dusting device 55 may include parts and modules of dusting device 10 as shown and described with reference to in FIG. 1, and/or parts and modules of dusting device 36 as shown and described with reference to in FIG. 2 (such parts and modules but may not be shown in FIG. 3).

Figure 4:
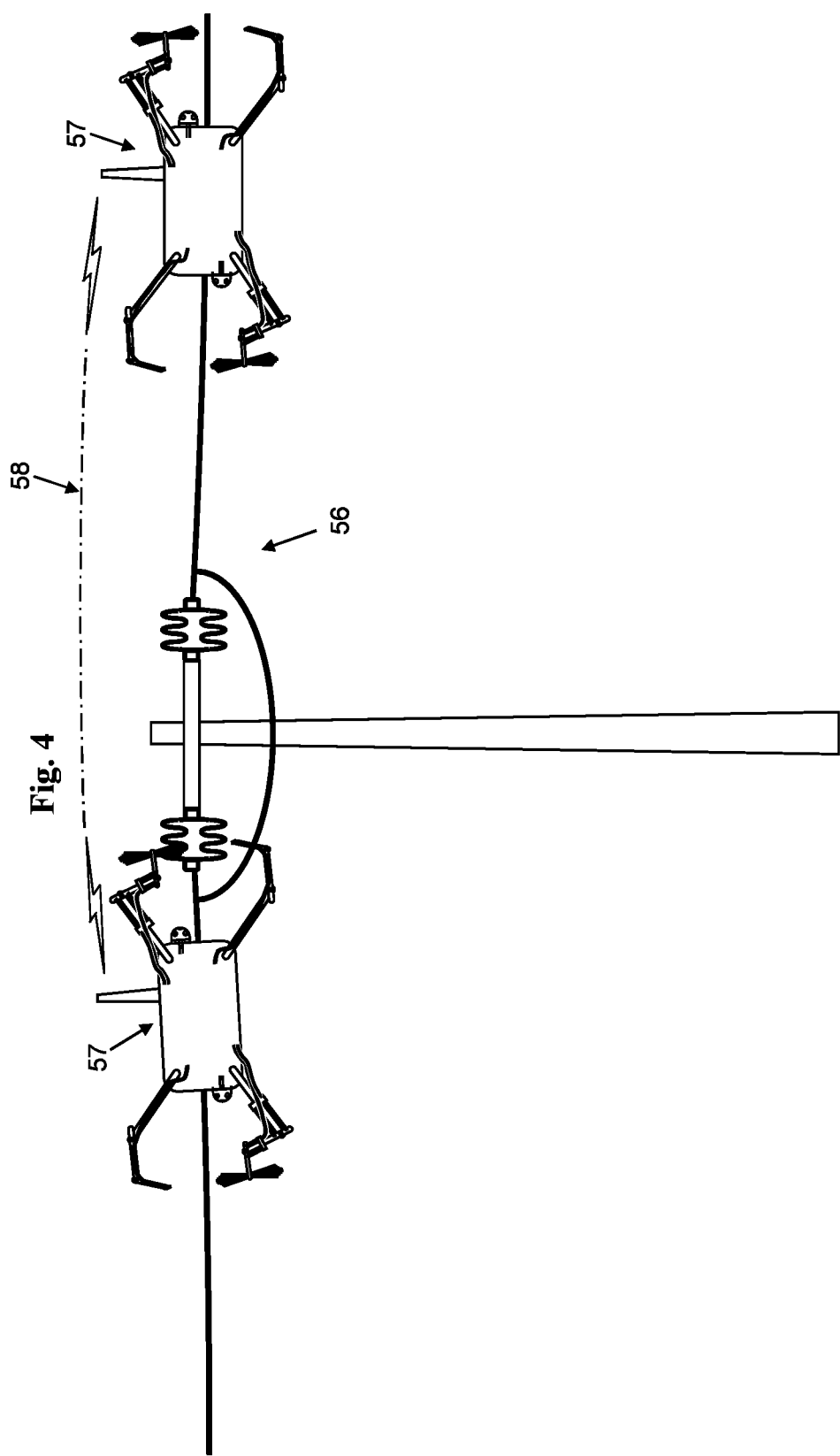
FIG. 4 is a simplified illustration of a part of an electric transmission or distribution network with two dusting devices.

Reference is now made to FIG. 4, which is a simplified illustration of a part of an electric transmission or distribution network 56 with two dusting devices 57, according to one exemplary embodiment. As an option, the illustration of FIG. 4 may be viewed in the context of the details of the previous Figures. Of course, however, the illustration of FIG. 4 may be viewed in the context of any desired environment. Further, the aforementioned definitions may equally apply to the description below.

Dusting devices 57 may be any type of dusting device such as dusting device 10 as shown and described with reference to FIG. 1, and/or insulator dusting device 36 as shown and described with reference to FIG. 2, and or dual-sided dusting device 55 as shown and described with reference to FIG. 3.

The cleaning and/or dusting operation of any of the plurality of dusting devices 57 mounted on different cable segments of electric transmission or distribution network 56 may be controlled and/or regulated based on current and/or voltage measurements taken by each of the plurality of dusting devices 57 as described with reference to FIG. 3. Additionally or alternatively, the cleaning and/or dusting operation of any of the plurality of dusting devices 57 may be controlled and/or regulated based on comparisons between current and/or voltage measurements of different dusting devices 57.

For example, the cleaning and/or dusting operation of a cable segment or an insulator may be controlled to lower the difference between current measurements of successive (close segments) or parallel (different electric phases) dusting devices 57.

It is appreciated that successive or parallel current and/or voltage measurements may be provided by any type of current and/or voltage measurements devices mounted over electric transmission or distribution network 56.

For example, any two dusting devices 57 may communicate between themselves. For example, dusting devices 57 may use wireless communication, such as Wi-Fi, or ZigBee, or cellular communication, or any other wireless communication technology, for example, by using a communication module such as Backhaul communication module 29 and local area communication module 31 shown and described with reference to dusting device 10 and FIG. 1.

For example, any two dusting devices 57 may communicate current and/or voltage measurements between themselves (e.g., 58). Such two or more dusting devices 57 may control, and/or regulate their respective cleaning and/or dusting operation of a cable segment or an insulator by comparing their respective current and/or voltage measurements. For example, to lower the difference between such measurements and/or to eliminate spikes and surges. For example, two or more dusting devices 57 may compare such measurements (current, voltage, spikes, surges, etc.) to determine which cable and/or insulator causes a problem and requires dusting and/or cleaning.

Figure 5:
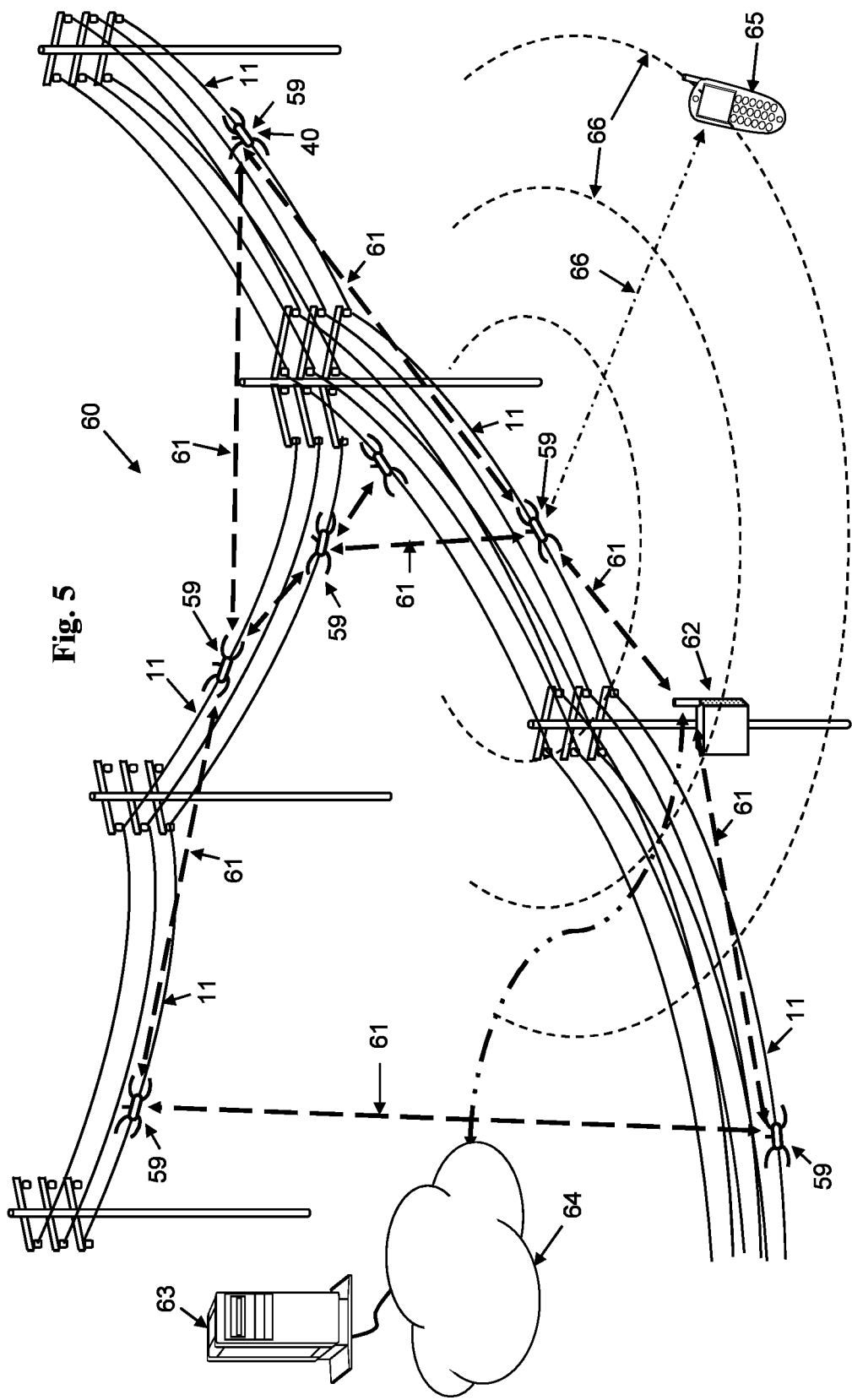
FIG. 5 is a simplified illustration of a plurality of dusting devices distributed over various cable segments of electric transmission or distribution network.

Reference is now made to FIG. 5, which is a simplified illustration of a plurality of dusting devices 59 distributed over various cable segments of electric transmission or distribution network 60, according to one exemplary embodiment. As an option, the illustration of FIG. 5 may be viewed in the context of the details of the previous Figures.

Of course, however, the illustration of FIG. 5 may be viewed in the context of any desired environment. Further, the aforementioned definitions may equally apply to the description below.

Dusting devices 59 may include one or more of any type of dusting devices such as dusting device 10, insulator dusting device 36, dual-sided insulator dusting device 55, shown and described with reference to FIGS. 1, 2, 3 and 4, and/or other types of cable, and/or insulator cleaning devices.

As shown in FIG. 5, electric transmission or distribution network 60 may include a plurality of segments of electric cable 11 and dusting devices 59 may be mounted on any segment of electric cable 11, including successive segments (carrying the same phase) and parallel segments (carrying a different phase).

As shown in FIG. 5, dusting devices 59 may communicate between themselves using, for example, backhaul communication module 29 shown and described with reference to FIG. 1. Dusting devices 59 may form, for example, a mesh network 61.

As shown in FIG. 5, dusting devices 59 may use their backhaul communication module 29 and/or mesh network 61 to communicate with an area controller 62. Area controller 62 may communicate with a central controller or server 63, for example, using a wide area wireless communication network (e.g. WAN), such as, for example, cellular network 64. It is appreciated that, as an option, dusting devices 59 may also communicate over WAN directly with the central controller or server 63.

As shown in FIG. 5, dusting devices 59 may also use their local area communication module 31 shown and described with reference to FIG. 1 to communicate with communication terminals 65 such as smartphone within the range of the local area network 66.

As dusting devices 59 move about their respective cable segments the mesh network 61 may change its topology. It is appreciated that such changes of the topology of the mesh network 61 may result in one or more of the dusting devices 59 being disconnected from the mesh network 61, and consequently from the area controller 62 and/or central controller 63. It also appreciated that when a first dusting device 59 is disconnected it may also disconnect other dusting devices 59 who depend on the first dusting device 59 for connectivity with the mesh network 61. It is also appreciated that a dusting device 59 may fail and disconnect a part of the mesh network 61 (e.g., one or more dusting devices 59) from the rest of the mesh network 61.

When a plurality of dusting devices 59 are mounted in a particular part of the electric transmission or distribution network 60 they arrange themselves in at least one particular topology (structure) of mesh network 61 in which all the dusting devices 59 are within the range of the mesh network 61. This particular topology or structure of mesh network 61 is recorded by the respective dusting devices 59 as a standard or default topology. The dusting devices 59 record their location in their respective segment of the electric cable 11, for example, by recording their respective GPS data in a non-volatile memory.

The process of organizing and recording one or more standard or default topologies or structures of the mesh network 61 and the respective positions of each of the dusting devices 59 may be executed under the control or supervision of the local area controller 62.

It is appreciated that several such standard or default topologies or structures of the mesh network 61 are created with the goal that no single failed dusting device 59 may disconnect a part of the mesh network 61. For example, if a particular dusting device 59 has failed there is a standard or default topologies or structures of the mesh network 61 in which all other dusting device 59 may communicate.

A dusting device 59, when disconnected from the network, may position itself automatically in its respective position in such standard or default topologies or structures of the mesh network 61. Particularly, when the dusting device 59 senses that it is disconnected from the mesh network 61 it automatically returns to the default location, for example as indicated by the GPS data recorded in the non-volatile memory as described above.

The plurality of standard or default topologies or structures may be ordered and a dusting device 59, when disconnected from the network, may scan the standard or default topologies or structures according to their order.

To resolve situation where one or more dusting device 59 are disconnected a part of the plurality of the dusting devices 59 may select a particular standard topology and the rest of the dusting devices 59 may scan the standard topologies until all the operative dusting devices 59 are in communication.

For example, the area controller 62 may select a standard topology according to the identification of the disconnected one or more dusting devices 59 and instruct the connected dusting devices 59 to assume this standard topology and wait for the disconnected one or more dusting devices 59 to connect. This process may repeat until all the disconnected one or more dusting devices 59 connect to the mesh network 61, or until one or more dusting devices 59 are determined faulty.

Alternatively, to reduce the risk of losing connectivity with a large part of the dusting devices 59, the area controller 62 may operate a single dusting device 59 at a time. The area controller 62 may instruct all the other dusting devices 59 to position themselves in their default locations, or in a particular standard topology selected to enable the operative (dusting) dusting device 59 to travel along its cable segment, for example, without interruption to is connectivity to the mesh network 61.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable sub-combination.

Although descriptions have been provided above in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art.

What is claimed is:

1. A device comprising:
a power supply module operative to extract electric power from a magnetic field surrounding an electric cable;
a propulsion module for maneuvering said device at least one of along said electric cable and around said cable;

a cleaning apparatus including at least one of a dusting module for cleaning said electric cable and an insulator cleaning module;

a measuring apparatus including at least one of a current measuring unit, a voltage measuring unit, and a temperature measuring unit; and a controller module controllably coupled to said propulsion module, said cleaning apparatus, and said measuring apparatus, wherein said device is mounted on a single electric cable of at least one of an electric transmission grid and an electric distribution grid, wherein said propulsion module, said cleaning apparatus, said measuring apparatus, and said controller module derive electric power from said power supply module, and wherein said controller module is operative to operate at least one of said propulsion module and said cleaning apparatus responsive to measurements taken by said measuring apparatus.

2. The device according to claim 1 wherein said dusting module comprises at least one of:
a brush for brushing said cable; and
an air blowing device for dusting said cable.

3. The device according to claim 1 additionally comprising:
a communication module communicatively coupled to said controller module, deriving electric power from said power supply module, and operative to perform at least one of:
receive a measurement taken by another device mounted on a single electric cable of at least one of an electric transmission grid and an electric distribution grid, said measurement comprising at least one of:
a current measurement taken by said current measuring unit,
a voltage measurement taken by said voltage measuring unit,
a temperature measuring unit, and
an image taken by a camera,
wherein said controller module is operative to operate at least one of said propulsion module and said cleaning apparatus responsive to said measurements taken by said at least one of a current measuring unit, a voltage measuring unit, a temperature measuring unit, and a camera of another device.

4. The device according to claim 1 wherein said insulator cleaning module comprises at least one of:
a brush for brushing an insulator;
an air blowing module for dusting said insulator; and
an articulated arm for moving said at least one of a brush and an air blowing module along said insulator.

5. The device according to claim 4, wherein said controller module is operative to:
autonomously direct said device along said electric cable towards an insulator;
autonomously identify said insulator;
autonomously select a cleaning plan for said identified insulator; and
autonomously operate said articulated arm and said cleaning device accordingly to said cleaning plan.

6. A method for cleaning an electric cable of a transmission network, the method comprising:
providing a device comprising:

a power supply module operative to extract electric power from magnetic field surrounding an electric cable, a propulsion module for maneuvering said device at least one of along said electric cable and around said cable, a cleaning apparatus comprising at least one of:
a dusting module for cleaning said electric cable, and
an insulator cleaning module, a measuring apparatus comprising at least one of a current measuring unit, a voltage measuring unit, and a temperature measuring unit, and a controller module controllably coupled to said propulsion module, said cleaning apparatus, and said measuring apparatus, wherein said propulsion module, said cleaning apparatus, said measuring apparatus, and said controller module derive electric power from said power supply module;

mounting said device on a single electric cable of at least one of an electric transmission grid and an electric distribution grid;

operating at least one of said current measuring unit and said voltage measuring unit to provide at least one measurement; and operating at least one of said propulsion module and said cleaning apparatus responsive to said at least one measurement.

7. The method according to claim 6 additionally comprising at least one of:
a brush for brushing said cable; and
an air blowing device for dusting said cable.

8. The method according to claim 6 additionally comprising:
additionally providing a communication module communicatively coupled to said controller module and operative to perform at least one of:
communicate a measurement comprising at least one of:
a current measurement taken by said current measuring unit,
a voltage measurement taken by said voltage measuring unit,
a temperature measuring unit, and
an image taken by a camera, and
receive said measurement taken by another device; and
operating at least one of said propulsion module and said cleaning apparatus responsive to at least one measurement taken by another device.

9. The method according to claim 6, additionally providing said insulator cleaning module with at least one of:
a brush for brushing an insulator;
an air blowing module for dusting said insulator; and
an articulated arm for moving said at least one of a brush and an air blowing module along said insulator.

10. The method according to claim 9, additionally comprising:
autonomously directing said device along said electric cable towards an insulator;
autonomously identifying said insulator;
autonomously selecting a cleaning plan for said identified insulator; and
autonomously operating said articulated arm and said cleaning device accordingly to said cleaning plan.

11. The method according to claim 6 additionally providing said insulator cleaning module with a communication module deriving electric power from said power supply module, and configured to communicate with a remote controller, and a controller module controllably coupled to said propulsion module, said insulator cleaning module, and said communication module, and using said controller, operating at least one of said propulsion module and said cleaning apparatus responsive to commands received from said remote controller.

* * * * *